Oct. 28, 1952     H. NELSON     2,615,670
VACUUM VALVE
Filed March 6, 1948
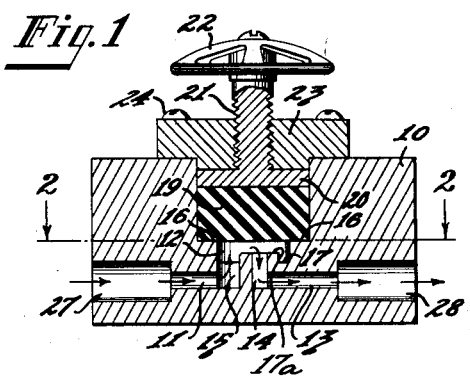
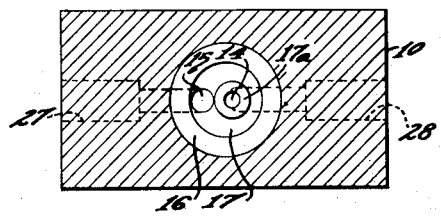
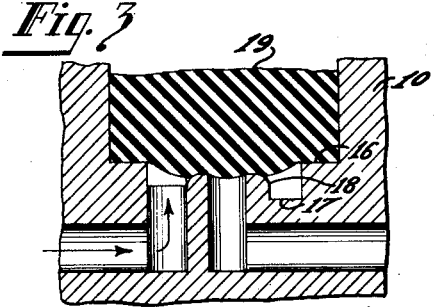
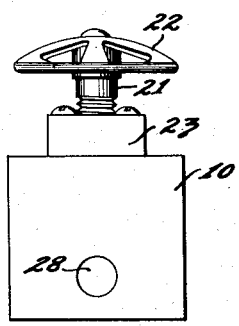
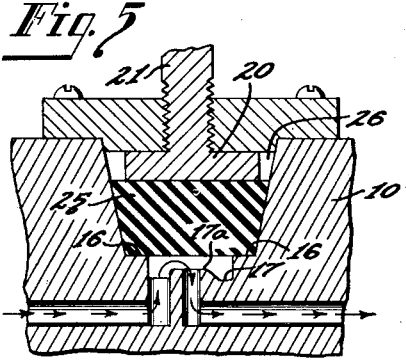
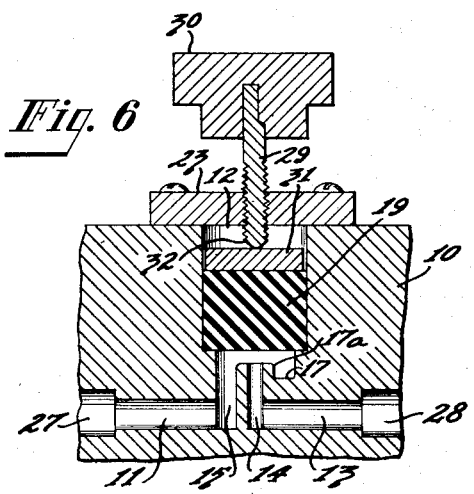
INVENTOR
HERBERT NELSON
BY *William A. Zalesak*
ATTORNEY Patented Oct. 28, 1952

2,615,670

UNITED STATES PATENT OFFICE 2,615,670

VACUUM VALVE

Herbert Nelson, Bloomfield, N. J., assignor to Radio Corporation of America, a corporation of Delaware Application March 6, 1948, Serial No. 13,431

1 Claim. (Cl. 251—24)

The present invention relates to valves for fluids and more particularly to valves capable of accomplishing vacuum tight seals.

It is an object of the invention to provide a valve that will be effective as a closure and opening means in a vacuum system over an appreciable length of time without failure.

It is a further object to provide a valve that is relatively simple in construction and economical to repair and suitable for a vacuum system.

Another object is to provide a valve having a fixed portion subject to relatively light wear during operation, and a movable wear-absorbing member that is replaceable.

A further object is to provide a vacuum valve having a flexible movable member, whose support engaging surfaces are substantially fixed in their supports.

A still further object is to provide a valve having a flexible closure member responsive to an axial force in one direction to close said valve and to also build up a counter force, said counter force serving to open said valve when said axial force is released.

According to the invention these objects are attained by the provision of a valve having a stop member made of resilient material and adapted to engage a metallic seat in said valve, with a surface portion intermediate the sides of said stop member. The stop member is preferably supported in a recess in the valve in snug engagement with side surfaces thereof. One end of the recess may be provided with a shoulder and communicates with a valve seat. Means are provided for applying a force to said stop member in a direction parallel to the side surfaces of said recess and towards said valve seat. The shoulder referred to prevents substantial movement between said surfaces of the recess and the stop member in response to said force but permits axial movement of a portion of the stop member intermediate the sides thereof. This axial movement of a portion of the stop member is in the nature of a flexure of a diaphragm and results in engagement thereby with the valve seat. The flexure referred to builds up a reserve force which serves to unseat the stop member on release of the applied force.

Further objects and features of the invention will appear as the present description continues.

Referring to the drawing:

Figure 1 shows a sectional elevation of a valve incorporating the invention;

Figure 2 shows a horizontal section along the line 2—2 of Fgure 1;

Figure 3 is a sectional elevation on an enlarged scale of a portion of Figure 1 showing the valve in closed position;

Figure 4 is a side view of the valve of the invention;

Figure 5 depicts a sectional elevation of one embodiment of the invention; and

Figure 6 shows a cross section of an elevation of another embodiment of the invention.

Considering the drawing in more detail and referring more particularly to Figure 1, the novel valve according to the invention comprises a metallic housing 10 provided with three bores or passageways 11, 12 and 13. Bores 11 and 13 are generally coaxial and perpendicular to the axis of bore 12 and communicate with the latter through passageways 14 and 15. Passageways 14 and 15 represent continuations of bores 11 and 13 but extend at right angles thereto so as to be in parallel relation to bore 12.

Bore 12 constitutes a recess, the lower portion of which, as viewed in Figure 1, terminates in a surface including an annular shoulder 16 shown best in Figure 2, and a lower surface 17, having two openings or orifices communicating with the passageways 14 and 15. The passageway 14 terminates in a lip 17a disposed in a slightly raised portion of surface 17, and which is provided with an annular beveled side 18 shown best in Figure 3, to constitute a valve seat.

The recess formed by bore 12 is also designed to receive plug 19 made of resilient material, such as gum rubber, in snug engagement with its side surfaces or walls and the shoulder 16. The mass of the plug 19 is so related to the space afforded by the recess or bore 12, that the plug is subject to some radial compression, which serves to maintain a vacuum seal between the plug and the recess walls at all times. Means for urging the plug 19 in engagement with the valve seat provided by the raised end of passageway 14 and the beveled side 18, comprises a plunger 20 having a threaded shank 21 and a manually operable head 22. The threaded shank 21 suitably engages block 23 in threaded relation, the latter being fixed to housing 10 as by screws 24.

In operation, a turning of head 22 to cause plunger 20 to travel downwardly as viewed in Figure 1, will exert pressure on plug 19. Since plug 19 is seated on shoulder 16, it is restrained from bodily rectilinear movement in a downward direction. However, due to the relatively soft texture of plug 19, it will respond in compression to the force applied thereto by plunger 20. As a consequence of this compression, plug 19 will seek release at any free surface thereof. Such free surface is provided in the lower face of the plunger opposite the lower surface 17 at the bottom of bore 12. This free surface of plug 19 will therefore bulge outwardly and expand toward said lower surface 17. However, in doing so, it will engage the valve seat provided by lip 17a at the end of passageway 14 and the beveled wall 18 to effectively seal said passageway, as shown in Figure 3. When the force of plunger 20 on plug 19 is released, as by turning the head 22 thereof to raise the plunger, the resiliency of the plug 19 is such as to cause it to disengage from the valve seat and assume a normal unstressed condition, as shown in Figure 1. This makes it unnecessary to attach the plunger 20 to the plug 19, which results in an advantage to be described further herein.

Another form of the invention is shown in Figure 5 wherein the plug 25 is shown of tapered construction and the bore or recess 26 in housing 10 is provided with conical walls. This construction is of particular advantage in replacing the plug 25 when worn. Thus, in inserting a fresh plug, the wider end of the conical recess 26 provides a relatively large opening for receiving the narrow end of plug 25. In addition to facilitating the initial insertion of the plug 25 in the recess 26, it contributes to ease in the passage thereof through the recess to engage shoulder 16 provided thereon. The ease of such passage results from the absence of surface engagement between the recess walls and the sides of the plug until the plug has been inserted to the desired depth and in engagement with the shoulder referred to. On removing a worn plug, only an initial effort is required to disengage the contacting surfaces of the plug and the recess walls. It is therefore apparent that the modification shown in Figure 5 is preferable to the arrangement shown in Figure 1, where ease of insertion and removal of the plug is of paramount importance.

A further modification is shown in Figure 6. In this modification the means for compressing or flexing the plug or valve member 19 into engagement with the valve seat formed on the raised surface or lip 17a at the bottom of the bore 12 comprises a threaded shank 29 engaging block 23 and having a head portion 30 for manually turning the shank on its longitudinal axis, and the metallic washer 31. The metallic washer 31 has radial dimensions permitting it to slide freely on the side walls of bore 12 but preventing substantial angular displacement from said bore walls. The shank 29 may have a tapered end 32 for reducing friction between it and washer 31 when the shank is rotated in either compressing plug 19 or releasing pressure thereon. It is not necessary that washer 31 be fastened either to the shank 29 or to the plug 19, since once the washer is inserted into the bore 12 on top of the plug 19, it will retain its position therein by the block 23.

In this modification, as in the previous ones described, the plug is made of resilient material that is characterized by a sufficient rigidity so as to become automatically displaced from the valve seat on release of the axial force applied thereto by shank 29 through washer 31. The rigidity and resiliency of the material of which plug 19 is made, are so balanced that they permit the plug to flex to engage the valve seat and to revert to its normal shape after release of the flexing force even though the valve should communicate with a vacuum chamber in its open position. Specifically, the plug is deformable in response to pressure by washer 31 above atmospheric pressure but is resistant to deformation in response to pressures at or below atmospheric values. A material well suited as the composition of plug 19 and well capable of meeting the foregoing demands upon it, is gum rubber. Any other material of similar characteristics may of course be used with equal advantage.

A valve of the type described is particularly suited for use in connection with evacuating systems where a high degree of vacuum is desired. The enlarged portions 27 and 28 of the passageways 11 and 13 may communicate with suitable conduits in such a system.

In high vacuum work, surfaces of a valve subjected to appreciable sliding action will detract from good vacuum conditions for the reason that it is very difficult to maintain a vacuum between such moving surfaces due to the unsatisfactory seal provided therebetween. It is therefore desirable that a valve for a vacuum system be provided with elements that are mechanically substantially fixed, at the portions thereof forming the seal. The invention is particularly advantageous in this connection, since a portion of the side surface of plunger 19 in Figure 1, or 25 in Figure 5, is stationary during the compressions of the plug by the plunger 20. Such compressions do not affect the surface engagement between the lower portions of the side of the plunger 19 as viewed in Figure 1 with the walls of the recess or bore 12 near the shoulder 16, since the compressive force is applied at a displaced location therefrom. To improve the seal between the side surface of the plunger 19, 25 and the walls of the recess 12, 26 a layer of castor oil may be applied to said surface before the plug is inserted in the recess.

It will be appreciated therefore that the invention provides a novel and advantageous valve, particularly useful in association with vacuum systems. The use of a readily removable plug results in a minimum of interruption of operations in which the valve is employed. Furthermore, the use of resilient material as the composition of the plug is of advantage in several respects. It permits a valve action to be accomplished by a flexure or diaphragm action of the plug while maintaining the sides of the plug in substantially fixed relation with respect to the sides of the recess in which it is housed. The resiliency of the plug, in addition, causes it to become automatically displaced from the valve seat on release of pressure thereon, which renders it unnecessary to fasten the plug to the pressure imparting means. This is of advantage in facilitating a rapid replacement of a worn plug. The modification of the invention using a tapered plug is of especial advantage in facilitating removal of a worn plug and its replacement by a fresh one.

It should be understood that the drawings are merely illustrative of the principles involved in the invention and are not to be deemed as limitative, and that modifications may be made without departing from the spirit and scope thereof.

I claim:

A vacuum valve comprising a casing having an inlet and an outlet duct adapted to be connected respectively to a vacuum source and a space to be evacuated, said casing having a bore extending at right angles to said inlet and outlet ducts, said inlet duct communicating with one end of said bore, a tubular member in said casing coaxial with said bore and communicating with said outlet duct, said tubular member terminating within said bore in a lip in a plane normal to the axis of said bore, said bore having an annular shoulder, said shoulder having a surface in a plane parallel to said first-named plane and spaced therefrom in the direction of the other end of said bore, a resilient plug snugly engaging the walls of said bore and having an annular portion at one end engaging said surface of said shoulder, said plug having a length for providing a relatively large mass whereby said plug is characterized by reduced flexibility and is urged away from said lip by said reduced flexibility when said valve is open, and means for flexing said plug into engagement with said lip for closing said valve, said means comprising a metal cylinder having one end engaging the other end of said plug, and a screw assembly including an axially movable shank having a pointed end engaging the other end of said cylinder with reduced friction and adapted to urge said cylinder against said plug to flex the same to close the valve, the sides of said cylinder being relatively close to the walls of said bore for free axial movement therein, said cylinder having a length for providing a uniform distribution of force to said other end of the plug and for preventing tilting of said cylinder, said length of said plug providing a relatively large area of snug engagement between the sides of the plug and the walls of said bore, whereby an appreciable portion of said area of snug engagement persists to prevent vacuum loss through said bore when said plug is flexed.

HERBERT NELSON.

REFERENCES CITED

The following references are of record in the file of this patent:

UNITED STATES PATENTS

| Number | Name | Date |
| --- | --- | --- |
| 232,380 | Truesdale | Sept. 21, 1880 |
| 627,561 | Williams | June 27, 1899 |
| 1,740,004 | Crowley | Dec. 17, 1929 |
| 2,323,421 | Reed | July 6, 1943 |
| 2,348,083 | McCabe | May 2, 1944 |
| 2,348,110 | Crowley | May 2, 1944 |

FOREIGN PATENTS

| Number | Country | Date |
| --- | --- | --- |
| 4,101 | Great Britain | of 1896 |
| 216,031 | Switzerland | of 1941 |
| 293,443 | Italy | of 1932 |